United States Patent Office 3,343,945
Patented Sept. 26, 1967

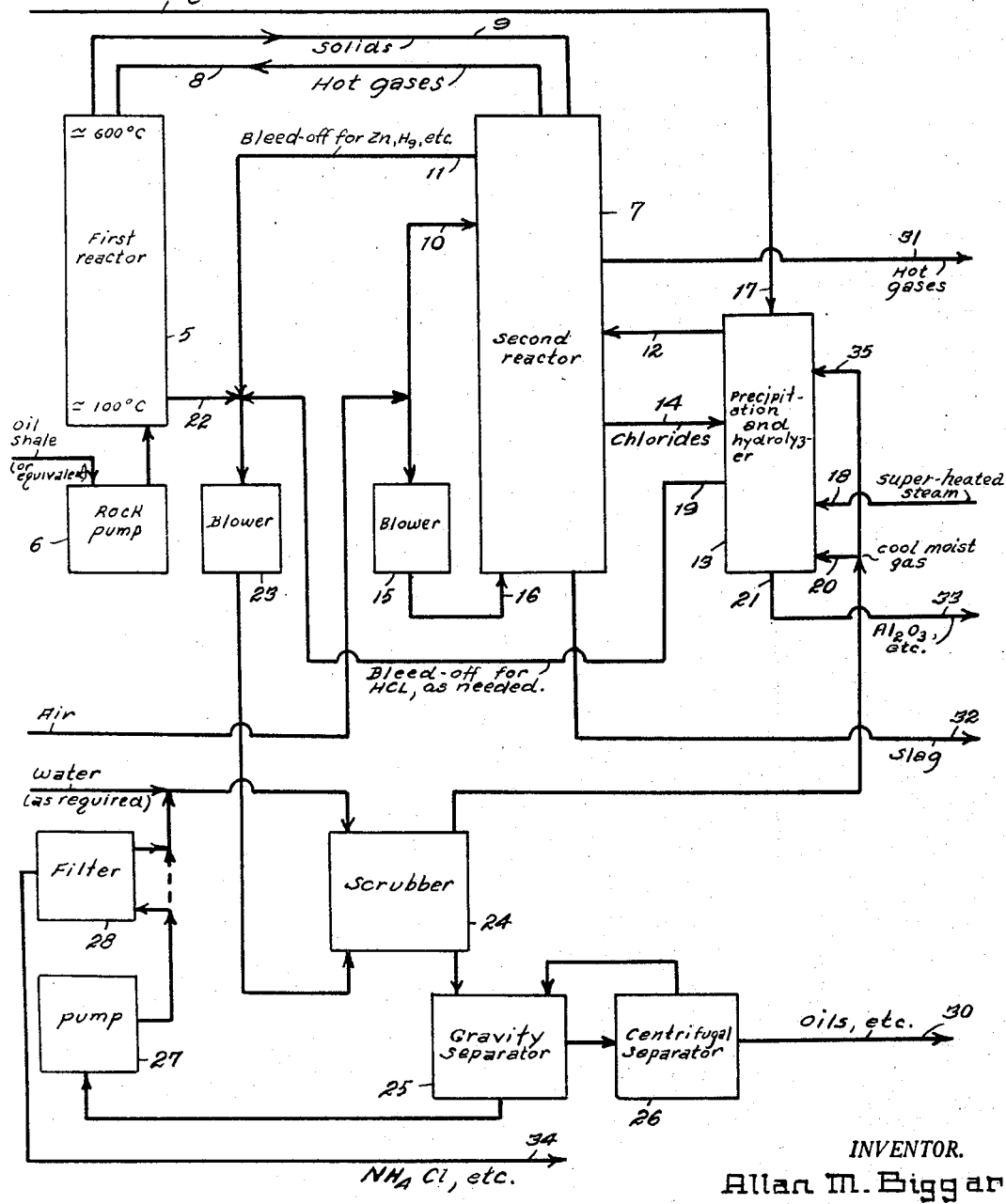

3,343,945
METHOD FOR EXTRACTING THE ELEMENTAL CHEMICAL CONSTITUENTS OF LOW GRADE ORES AND OF VARIOUS OTHER SUBSTANCES
Allan M. Biggar, 3121 N. Oakland St., Arlington, Va. 22207
Filed Mar. 4, 1965, Ser. No. 437,327
8 Claims. (Cl. 75—1)

The invention described herein may be manufactured and used by or for the Government for governmental purposes, without the payment to me of any royalty thereon.

This invention relates to the concentration and extraction of elemental constituents of various earthy mixtures. Specifically, it relates to the extraction of the oxides of aluminum and other metals from substances such as oil shale, in which the desired oxides are present in association with large proportions of dross matter.

Most of the chemical elements which occur naturally in the earth's surface are nearly always present, at least in trace quantities, as constituents of the more common rock formations. Despite the high cost of some of these elements, and despite the large demand which exists for many of these elements, their concentration in the common rocks and other common materials is usually far too low to permit profitable extraction from these sources by present commercial processes. The treatment hereinafter described in detail is primarily a combination of co-operating processes which, as a result of their joint action on mixtures of common substances and upon each other, economically bring the valuable constituents of such substances into a state of greater concentration and segregate those constituents from objectionable dross material to an extent where ultimate extraction and purification of the individual elemental ingredients by well known conventional procedures becomes practical.

Many processes are known for the chemical extraction of aluminum and other metallic compounds from substances such as clay. Among these are several processes involving chlorination of the metallic compounds by gaseous chlorine or chlorine-containing materials followed by subsequent distillation and recovery of the metallic chlorides. In general, these processes are rather wasteful of any chemicals which they utilize, and the products from the processes are generally of such a nature as to require difficult and costly subsequent treatment and handling. A further objection which exists to many of these operations, is that they waste considerable amounts of energy in their operation, and in that the associated equipment is unduly costly to build, operate and maintain.

It is among the objects of this invention to provide novel improved processes and operational procedure for effecting the separation of aluminum oxide and other metal oxides from dross matter through the use of a continuous chlorine oxidation-reduction cycle whereby the principal metallic constituents may be recovered as the corresponding oxides.

Another object of this invention is to provide means for concentrating trace quantities of various chemical elements originally present in mixture with metallic oxides and dross matter to an extent such that it becomes possible to recover these chemicals by commercially practical means.

A further object of this invention is to provide an improved means of replenishing chlorine, which is inevitably lost in processes of this type, by the addition of inexpensive crude forms of sodium chloride.

Briefly this process consists of reducing the desired metal oxides in the presence of carbon and chlorine to the corresponding chlorides, distilling off the chlorides which are subsequently oxidized by oxygen or water vapor back to the metallic oxides and recovered as the solid oxides. The chlorine or hydrogen chloride released is recycled, through the use of calcium oxide as a catalyst or carrier, and is used to chlorinate additional quantities of metal oxides in the material treated.

The basic material used in this process is an intimate mixture of siliceous, calcareous, carbonaceous and other substances. The exact nature and proportions of these substances is not critical, and may be varied over relatively wide limits to best utilize available sources. The mixture may be a naturally occurring one, or it may be artifically prepared; an example of a suitable natural mixture being the oil shale (a natural mixture of clayey substance, dolomite, and keragen) found in the so-called "Mahogany Ledge" of Colorado and bordering states. Mixtures of clay, or silica sands, or finely divided silicate rocks, etc. with materials such as peat, or coke, or lignite, or coal, or sawdust, etc., and with finely divided limestone, or marl, or shell, or dolomite, etc. would also be suitable for this process, either with or without the admixture of various ores.

Other objects and advantages will be apparent from the ensuing description of the invention as well as from the accompanying drawing showing a flow-sheet of one operation of this process.

Referring to the drawing, 5 represents a chamber in which the oil shale or other suitable natural or artificial mixture of siliceous, calcareous and carbonaceous materials is fed upward by a rock pump 6 and gradually heated by hot gases from chamber 7. These gases heat the ore to approximately 600° C. at the top of chamber 5 and are cooled as they are drawn downward through the rising material to an approximate temperature of 100° C. and are drawn off at the bottom. This treatment causes destructive distillation of the solid material and releases the contained water and a variety of oils and gases. The heated solid material passes out of the chamber 5 at the top and is fed to the top of the chamber 7, after which it falls by gravity through this chamber. The flows denoted by lines 8 and 9 take place through a short chute or interconnecting passageway through which the solids and gases pass countercurrent to each other. Air is admitted to chamber 7 through the line 10 to support a partial combustion of the carbonaceous material contained in the ore and the hot combustion products are drawn upward through the descending material. An outlet 11 located just above the highest temperature zone in chamber 7, may optionally be used to bleed off the more volatile metals and their compounds, thereby segregating elements such as antimony, arsenic, bismuth, lead manganese, tin, zinc, silver, gold, mercury and others. This serves to drastically reduce the proportion of dross elements such as aluminum, calcium, silicon and iron associated with these more valuable elements. The hot gases emanating from the top of chamber 7 which provide the heat for chamber 5, also carry back many of the chemical elements, either in their elemental form or in the form of easily vaporized compounds which are reprecipitated by contact with the cooler solids and are recycled. As a result of this recycling, several of the aforementioned volatile elements tend to reach a maximum concentration at line 11.

As the material reaches the center of chamber 7 a maximum temperature of approximately 2000° C. has been reached and a halogen-containing substance is introduced through line 12. There follows the well known "Oersted's reaction" wherein a metallic oxide heated with carbon is caused to unit with some halogen-containing substance to form the corresponding halide. In this case the metallic oxide is the calcium oxide contained in the solid material being treated, and the halogen is mostly in the form of hydrogen chloride contained in the stripped gases channeled from the chamber 13.

These hydrogen chloride containing gases are not excessively hot, less than 1000° C., so that very little of the resultant calcium chloride is vaporized. At a point near the bottom of chamber 7 chlorine derived from the calcium chloride in a subsequent step reacts with the remaining metallic oxides present (silica is relatively difficult to chlorinate) and with carbon to form the corresponding chlorides. Any reduced metals present are similarly converted to the corresponding chlorides at this point. Owing to the low reactivity of silica and the low volatility of silica, calcium chloride, and carbon, these materials tend to stay in the chamber 7, while the other materials form volatile compounds which are carried in a vaporized state through line 14 to chamber 13. This effects a separation of the remaining desired elements from a much larger bulk of essentially dross material, with elements such as aluminum, titanium, iron, uranium, thorium and various others being concentrated in the effluent gases. Of the material remaining in chamber 7, advantage is preferably taken of the fact that certain oxides are more easily chlorinated than others. In passing countercurrent to the solid materials, certain materials in the gases, particularly silicon chloride, and to some extent aluminum chloride, interact with the more easily chlorinated oxides, such as those of iron, titanium and calcium to form chlorides of those metals and to precipitate silica or alumina. This reaction may be used to considerably reduce the amount of silicon present in the gases leaving this stage of the process, without significantly interfering with the recovery of most of the other elements present. At the bottom of the chamber 7 air or oxygen from the blower 15 injected at 16 burns the remaining carbon in the solid material and causes the calcium chloride to react with silica and oxygen to produce calcium silicate and free chlorine as indicated in the equation:

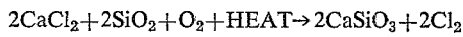
$$2CaCl_2 + 2SiO_2 + O_2 + HEAT \rightarrow 2CaSiO_3 + 2Cl_2$$

The resultant calcium silicate is a semifluid molten slag, which is drawn off as waste or for spinning into "rock wool" or other similar products. This removes the last of the material originally entering the process, thus permitting continuous downward flow of the solids in chamber 7 as the various reactions proceed.

The volatile chlorides having been introduced in the third chamber 13 through the line 14, are subjected to a cool moist gas introduced at 35 to chill and to partially hydrolyze the chlorides in the gases causing them to precipitate either as chlorides or, in the case of certain elements such as alumina, as oxides in accordance with the equation:

$$2AlCl_3 + 3H_2O \rightarrow Al_2O_3 + 6HCl + HEAT$$

Sodium chloride is introduced at 17 for the purpose of maintaining a satisfactory chlorine level in the operation by replacing any chlorine lost in the process. The sodium chloride and aluminum oxide are treated with superheated steam at 18 as they settle in the chamber 13 to form hydrogen chloride and sodium aluminate as shown in the equation:

$$Al_2O_3 + 2NaCl + H_2O + HEAT \rightarrow 2NaAlO_2 + 2HCl$$

Part of the hydrogen chloride formed may be bled-off at 19 as a means of obtaining hydrogen chloride, free of elemental chlorine, to replace quantities used up in forming ammonium chloride and salts of the various metallic elements drawn off from chamber 7 through line 11. Cool moist gas is again introduced at 20 to cool the hot mixture of solids prior to discharge at 21, and further react with any residual chlorides present hydrolyzing them to the corresponding oxides and hydrogen chloride. All the rest of the gases from chamber 13 are returned by line 12 to the second chamber 7 for use in the treatment in that chamber. Any excess moisture in these gases is subsequently reduced to hydrogen and carbon monoxide when it contacts the hot carbon in chamber 7 and is thus made inert. It will be recognized that steam, or other forms of moisture may be substituted for the moist gases introduced in chamber 13 and the treatment may be conducted in two or more identical stages in series, if desired, with the result that certain more easily chlorinated materials, such as iron and titanium oxides, are further separated from materials such as aluminum oxide. In the event that this option is exercised, the precipitate from the first stage can be made to contain principally aluminum compounds, and the precipitates from subsequent stages can be made to contain most of the other elements present.

The gases drawn from chamber 5 at 22 and those from chamber 7 at 11 by a blower 23, are directed to a scrubber 24 for countercurrent washing with water or other suitable fluid. The purpose of this washing is to remove from these gases the oils, tars, ammonia, hydrochloric acid, and various vaporized substances which they contain, and to stabilize the temperature and moisture content of the washed gases for further use. Various conventional means, such as gravity separators, centrifuges, etc., may be used to separate the recovered material into easily handled fractions as indicated in the drawing. The aqueous solution of the various chlorides drawn from the scrubber 24 are treated by a series of separators 25 and 26 to remove oils and tars, and the solution leaving the separator 25 is drawn by a recycle pump 27 to a continuous rotary filter 28 to remove various solid materials including those which crystallize out due to a gradual accumulation.

It is recognized that various modifications in the process heretofore described may be made such as the substitution of other halogen elements for chlorine which is preferred and other alkaline substances for the calcium oxide which is also preferred. Such substitutions are within the scope of this process, but are generally less satisfactory than the materials employed when considering cost, relative scarcities of possible substitute materials, and the definite advantages offered by the unusually high and consistent ratio of boiling points between calcium chloride and the chlorides of most other elements.

The siliceous, calcareous, carbonaceous, and other substances in the basic material, together with the air, water, and crude sodium chloride utilized in the processing, all introduce a variety of chemical elements into the process. All of these elements are eventually distributed into one or more of five channels as new compositions of matter. The first product 30 consists of various oils, tars, and waxes, essentially free from all elements other than carbon and hydrogen. This product may not be a consideration under certain circumstances where destructive distillation of the carbonaceous matter is not involved. The second product 31 is a mixture of heated gases, principally carbon monoxide and nitrogen, but also including considerable hydrogen, some hydrocarbons, all of the inert gases of the helium series, and traces of other impurities. The third product 32 is a molten slag containing calcium silicate, silica and traces of calcium chloride, calcium aluminum silicate, and possibly metals of the platinum group. This would normally be a waste material; however in view of its relatively high purity and molten condition, it may be utilized for certain by-products. The fourth product 33 is a complex mixture for which the name "artificial bauxite" is used when alumina predominates. This product tends to concentrate all elements with the exception of carbon, sulphur, phosphorous, the halogens, and possibly a few others such as mercury and certain metals of the platinum group. The fifth product 34 is also a complex mixture, which will also vary considerably as a result of processing conditions, and will ordinarily contain chlorides of ammonia and various organic bases, such as pyridine derived from the destructive distillation of the carbonaceous matter. In addition to these materials this channel will also contain the largest part of the following elements, insofar as they are present: antimony, arsenic, barium, beryllium, bismuth, boron, bromine, cadmium, cerium, cesium, chlorine, chromium, copper, the rare earth series of elements, fluorine, gallium, germanium, gold, indium, iodine, lead, lithium, manganese, mercury, phosphorous, polonium, potassium, radium, rubidium, scandium, selenium, silver, strontium, sulphur, tellurium, thallium, tin, and zinc.

This process is designed primarily for the recovery of aluminum from low grade ores and yields a product which is equivalent to natural bauxite of at least 85% $Al_2O_3$ content. Dross element dilution of many other elements, in addition to aluminum, is concurrently lowered to a point where further concentration and recovery of the more valuable elements present in the mixture by use of conventional procedures is no longer commercially impractical.

In any process involving the use of high temperatures and corrosive atmosphees, rapid deterioration of equipment often limits the economic usefulness of the process. In my process it is possible to minimize such deterioration by constructing certain portions, particularly the walls of chamber 7, of a somewhat porous material and by maintaining air or an inert gas such as nitrogen at pressures slightly higher than atmospheric in a jacket surrounding such portions of the equipment. This also avoids the need for thermal insulation of the jacketed portions. It will be seen that flows in my process are such that most handling operations can be performed at relatively low temperatures.

What is claimed is:

1. A process for concentrating aluminum from low grade ores comprising, subjecting the contained material of said ores to a temperature of approximately 2000° C. in a reducing atmosphere containing hydrogen halide gas, separating the halides of aluminum and non-metallic elements from other materials present on the basis of their volatilities and relative stabilities, oxidizing the hot halide vapors to recover the desired aluminum from the ores as an oxide. and reusing the halogen chloride gas liberated by this oxidation to treat additional quantities of ore.

2. A process for treating low grade ores for recovery of an artificial high grade aluminum ore comprising, subjecting an aluminum containing material to a temperature of approximately 2000° C. in a reducing atmosphere containing a gaseous mixture of chlorine and hydrogen chloride, separating the aluminum chloride from most of the other components of the original ore on the basis of its volatility and relative stability, hydrolyzing the hot aluminum chloride containing gas to provide hydrogen chloride which is reused in the process, and recovering the aluminum as an oxide equivalent to natural bauxite of at least 85% $Al_2O_3$ content.

3. A process for concentrating aluminum from mixtures of carbonaceous materials with various other substances for recovery of selected metallic and non-metallic elements contained in said mixture comprising, progressively heating said material to a temperature of approximately 2000° C. in a reducing atmosphere thereby removing the more volatile elements and compounds by distillation, adding hydrogen chloride to the hot aluminum solids left, removing vapors of selected chlorides on the basis of their volatilities and relative stabilities, hydrolyzing these hot chloride vapors to form hydrogen chloride for reuse in the process, and recovering the solid aluminum oxide formed in the hydrolysis.

4. A process for treating mixtures of varying proportions of carbonaceous, calcareous, and siliceous substances containing low grade ores for recovery of the more desirable metallic and non-metallic elements present in said material comprising, progressively heating in several reactors said material to approximately 2000° C. in a reducing atmosphere thereby removing the more volatile elements and compounds, adding recycled hot gases containing chlorine in the first reactor in quantities such that they can be completely reacted by the calcareous matter present to form calcium chloride, exposing the hot solids to the chlorine gas in the second reactor, removing also in the second reactor those chlorides which are both readily volatile and relatively stable, oxidizing in the third reactor these chlorides to the corresponding oxides for recovery and to chlorine and hydrogen chloride for recycling, and intensely heating also in said third reactor the calcium chloride and silica residue in presence of air to form calcium silicate and the chlorine gas employed to form the volatile chlorides.

5. A process for treating various aluminum silicates, aluminum oxides, aluminum hydroxides, aluminum metal wastes, or other aluminum containing substances, or mixtures of these with each other or with other materials, together with carbonaceous and calcareous substances for recovery of an artificial high grade aluminum ore comprising, progressively heating in several reactors said material to approximately 2000° C. in a reducing atmosphere thereby removing the more volatile elements or compounds, adding recycled hot gases containing chlorine and hydrogen chloride in the first reactor in quantities such that they can be completely reacted by the calcareous matter present to form calcium chloride, exposing the hot solids to chlorine gas in the second reactor, removing also in the second reactor those chlorides which are both readily volatile and relatively stable, oxidizing in the third reactor these chlorides to produce the corresponding oxides in the form of an "Artificial Bauxite" equivalent to natural bauxite of at least 85% $Al_2O_3$ content together with chlorine and hydrogen chloride which is reused in the process, and intensely heating in said third reactor the calcium chloride containing residue in presence of air to form calcium silicate and calcium aluminate and the chlorine gas employed to form the volatile chlorides.

6. A process for replenishing chlorine or hydrogen chloride lost in the course of high temperature chlorine cycle processes for treatment of ores comprising, adding sodium chloride to a very hot gas containing aluminum chloride, oxidizing the chlorides contained in the gas to form chlorine and hydrogen chloride for reuse in the process, and recovering sodium aluminate together with the oxides of various other elements present as chlorides in the hot gas.

7. A process for treating compositions of matter containing variable proportions of carbonaceous, calcareous, and siliceous substances, occurring in oil shales, to concentrate for subsequent recovery selected metallic and non-metallic elements present in said compositions without materially interfering with the recovery of, or the purity of, such hydrocarbon oils, gases, tars, etc. as would otherwise be recoverable from said compositions by partial combustion, said process comprising, progressively heating in several reactors said composition to a temperature of approximately 2000° C., removing for subsequent recovery the volatile substances liberated by this heating, passing through the hot solids a gas containing chlorine and hydrogen chloride in the first reactor in quantities such that they can be completely reacted by the calcareous matter present to form calcium chloride, passing hot chlorine gas through the hot solids in the second reactor, removing also in the second reactor those chlorides which are both readily volatile and relatively stable, oxidizing in the third reactor these chlorides to the corresponding oxides for recovery and to chlorine and hydrogen chloride for recycling, intensely heating also in said third reactor the calcium chloride and silica residue in air to form calcium silicate and the chlorine gas employed to form the volatile chlorides, and finally removing the calcium silicate residue.

8. In a process for treating compositions of matter containing mixtures of carbonaceous, calcareous, and siliceous substances at high temperatures with corrosive gases such as chlorine comprising, reducing destructive effects on the equipment walls by making such walls of a porous refractory substance and maintaining a pressure somewhat higher on the outside of that wall than on the inside with a fluid selected from the group consisting of nitrogen, air and an inert gas.

References Cited

UNITED STATES PATENTS

| 2,184,885 | 12/1939 | Muskat et al. | 75—1 |
| 2,238,103 | 4/1941 | Fink et al. | 75—1 |
| 2,291,206 | 7/1942 | Bowes | 75—1 |
| 2,480,184 | 8/1949 | Erasmus | 75—1 |
| 2,905,545 | 9/1959 | Cookston | 75—1 |

BENJAMIN HENKIN, *Primary Examiner.*